United States Patent [19]

Lowe

[11] Patent Number: 4,986,371
[45] Date of Patent: Jan. 22, 1991

[54] SAFETY DEFLECTOR FOR AIR HAMMER AND CONCRETE BREAKER

[76] Inventor: Wayne L. Lowe, 72 Virginia St., Cottage Hills, Ill. 62018

[21] Appl. No.: 461,738

[22] Filed: Jan. 8, 1990

[51] Int. Cl.⁵ ............................................. B25D 17/10
[52] U.S. Cl. .................................... 173/171; 408/67
[58] Field of Search ................... 173/171, 31, DIG. 2, 173/14, 13; 408/67, 72

[56] References Cited

U.S. PATENT DOCUMENTS

| | | | |
|---|---|---|---|
| 2,949,975 | 8/1960 | Plummer | 181/230 |
| 3,583,821 | 6/1971 | Shaub et al. | 408/72 |
| 3,757,891 | 9/1973 | Krieger | 181/205 |

FOREIGN PATENT DOCUMENTS

| | | | |
|---|---|---|---|
| 2356565 | 5/1975 | Fed. Rep. of Germany | 408/67 |
| 2282974 | 3/1976 | France | 173/DIG. 2 |
| 1603874 | 12/1981 | United Kingdom | 173/DIG. 2 |

Primary Examiner—Hien H. Phan
Assistant Examiner—John M. Husar
Attorney, Agent, or Firm—Paul M. Denk

[57] ABSTRACT

A safety deflector for an air hammer, comprising a shield formed having a constricted neck portion, an outwardly flaring base portion, the neck portion of the shield applies to the lower end of an air hammer housing, and may be fastened in place either through its inherent resiliency and snug tightening about the housing, or a fastening band may be tightened in position, to more permanently secure the shield in place. Various slots are provided within the deflector, so as to facilitate its installation and application to the air hammer housing, and in addition, provide clearance for the manipulation of the locking lever provided at proximate the bottom of the hammer housing, to furnish clearance for its manipulation when installing or removing a bit from the air hammer.

4 Claims, 1 Drawing Sheet

SAFETY DEFLECTOR FOR AIR HAMMER AND CONCRETE BREAKER

BACKGROUND OF THE INVENTION

This invention relates generally to air hammers, and more specifically pertains to a safety shield for use in conjuction with air hammers or other forms of apparatus for use in crushing and breaking concrete or rock, and which shield prevents damage to the worker by intercepting the upward movement of any dust, broken chisel points, rock or concrete chips during the application and usage of the apparatus.

As is well known in the art, air hammers or jack hammers, as they are commonly known, are used for breaking up of concrete, rock, hard dirt, asphalt, and the like, and during such application and usage, it is quite common that concrete pieces, dust, or even possibly broken parts of the chisel bit, have a tendency to be thrusted upwardly, and on occasion, workers have subtained injury, sometimes severely, from such mishaps. But, even in view of such detrimental and harzardous activity, it is not believed that any effort has been made to include safety means into the application and usage of air hammers, and as result, the shield of this current invention is designed for ready application to the housing portion of such a hammer, either during its initial assembly, or as an after market product, in order to alleviate the incidence of such mishaps and injury.

SUMMARY OF THE INVENTION

This invention contemplates the fabrication of a resilient form of safety shield, one which may be applied directly onto the lower housing of an air hammer, in the vicinity of its chisel holding lever, and in such capacity intercepts and prevents the upward thrust of any rock or dirt during the application and usage of the device.

This safety deflector is generally formed of resilient material, and includes a neck portion, having an outwardly flaring portion that is integral with said neck portion, with the flaring portion generally undertaking a downward angulated disposition, somewhat constructed into the bell shape, and therein function to intercept and eliminate the upward thrust of rock, dirt, or the like, during its usage, and thereby prevent injury to the worker, and at the same time, having a tendency to accoustically dampen any noise that rises from the hammer during its application. The shield may be fixed in position by means of its neck portion having inherent resiliency that provides for its snug embracement against the housing of the air hammer, after its application, and in the alternative, to assure the more permanent application of the shield in places, a clamp, having fastening means connected therewith, may be tightly bound around the neck portion of the shield, to more permanently adhere it to the housing, after application. In addition, it is likely that the shield may be fabricated of more hardened polymer, and have one or more clearance slits provided at its neck portion, in order to provide for its insertion onto the housing, after clearing the chisel retaining lever during its application, and then have a clamp affixed around the neck portion, compressing it by collapsing along its formed slots, to provide for a tight binding of the shield about the hammer housing, for more permanent installation.

Where the shield may be fabricated in the preferred embodiment of more resilient material, such as a flexible polymer or rubber, it may include a clearance slot, that extends through the neck portion, and then further widens in the vicinity of its integral bell, so that the chisel lever that is used for tightening of the chisel in place, once installed, or which may be pivoted downwardly for a release of the chisel, may have adequate clearance through the shield to provide for manipulation of the lever, to allow for ease of removal or replacement of any chisel, used in conjuction with the air hammer during its application. Any type of polymer in the form of a more resilient polyurethane, or other types of resilient and flexible type of polymers, as readily known in the art, and which will withstand the impact of any dust, rock or concrete chips, may desirably be used in the fabrication of this safety deflector.

It is, therefore, the principal object of this invention to provide a safety shield used in the form of a deflector for application to an air hammer housing and to prevent and intercept the upward thrust of any rock, concrete, dirt, or the like, during usage of this type of instrument.

Still another object of this invention is to provide a resiliently formed safety deflector fabricated as a shield, and which is resilient in texture so as to facilitate the installation and application of it to an air hammer in preparation for its usage.

Still another object of this invention is to provide a safety deflector for use in combination with an air hammer, and more specifically for installation upon its lower housing, and thereby incorporating an integral neck portion which may either be snuggly adhered against the housing to provide for its application and usage, or which can be held into position by means of a fastening clamp.

Yet another object of this invention is to provide a safety deflector incorporating various clearance means in order to facilitate its application and usage to the housing of an air hammer, jack hammer, or concrete and rock breaker, or the like.

These and other objects will become more apparent to those skilled in the art upon reviewing this summary of the invention, and upon undertaking a study of the description of its preferred embodiment, in view of the drawing.

DESCRIPTION OF THE PREFERRED EMBODIMENT

Figure 1:
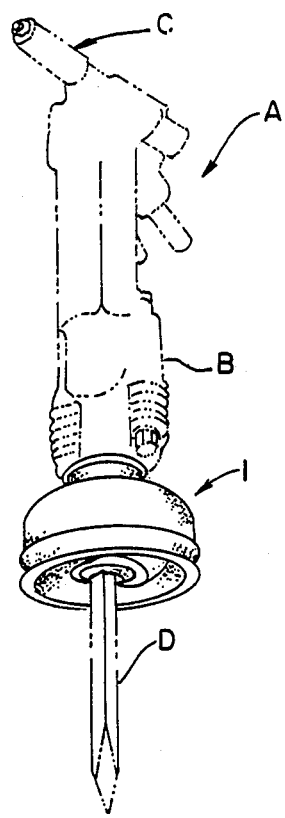
FIG. 1 provides an isometric view of an air hammer, shown in phantom line, with the safety deflector of this invention mounted thereon.
Figure 2:
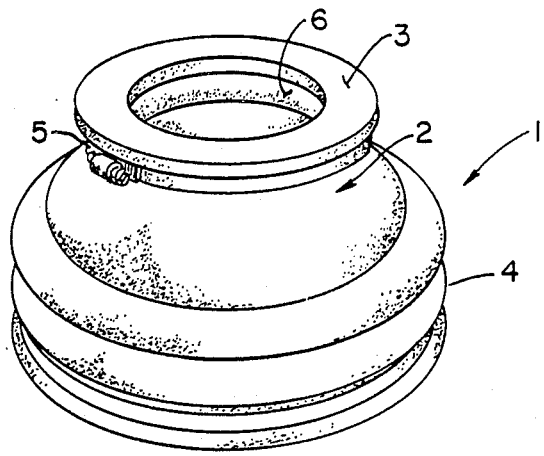
FIG. 2 provides an oblique view of the safety deflector of this invention, showing its fastening clamp.
Figure 3:
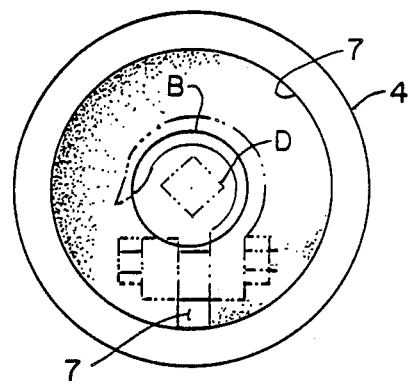
FIG. 3 is a bottom view of the safety deflector, shown mounted upon the air hammer, as taken along the region looking upwardly in FIG. 1.

In referring to the drawing, and in particular FIG. 1, an air hammer A is disclosed, and is of the type as generally referred to in the trade as jack hammer, or concrete breaker, and incorporates, as can be seen in phantom line, an elongated housing B having an operating handle, as at C, at its upper end, with a chisel D, as well known in the art, incorporating a lower pointed end useful for breaking up of concrete, rock, asphalt, and the like, as during application. As can be seen in FIG. 4, once again in phantom line, the lower end of the housing B incorporates the usual shock absorbing springs, as at E, while the lower end of the housing incorporates a pivotal lever means, as a F, and it is this lever means that is pivoted between an opened position, as at F, during which the chisel D may be inserted within the housing, and is then held in position when the lever is pivoted upwardly, as shown at the right side of FIG. 4, so as to lock the chisel in place. It is at this location of the housing that the safety deflector 1 as shown in FIG. 2, is applied and installed onto the air hammer, so as to achieve the attributes of its structure, during usage and application, to achieve the safety results as previously summarized herein.

This safety deflector is fabricated into the shape of a shield, for the pupose of providing just that, safety, to the operator of the air hammer, and is generally fabricated incorporating a neck portion, as at 2, having a flanged upper edge, as at 3, and a outwardly flaring lower section, as at 4, integrally formed extending from the lower edge of the neck 2. It is upon the neck 2 that a fastening band, as at 5, may be applied, and tightened in position, so as to assure the more permanent and snug retention of the safety deflector to the air hammer, once installed, and be precluded from vibrating free, as during usage.

The neck portion 2 includes an interior opening, as at 6, an it is this part of the shield that is snuggly biased upon the housing B, once installed. Interiorly of the safety deflector 1, and more specifically at its outwardly flaring segment 4, the opening 6 expands into a substantial opening 7, that surrounds the lower terminus of the housing B, and its held chisel D, in addition to providing clearance for its pivot locking lever F, as previously explained. Dimensional-wise, the deflector provides substantial clearance, by means of its opening 7, to furnish full protection around its bit or chisel D, and at the same time, flares outwardly sufficiently so as to provide that shield, as previously explained, that intercepts any rocks or debris that may fly upwardly, as the bit D digs into any rock or concrete, during its usage. As is readily understood, as the worker manipulates and utilizes an air hammer of this type, he presses firmly by means of his hands upon the laterally extending handles C, with the force of the upper torso of the worker generally aligned over the handle of the housing, and exerting a downward force thereon, to aid in the penetration of the chisel D into the rock, during usage. hence, that posture, the head of the worker is generally also aligned upwardly of the housing, and therefore, with the addition of this safety deflector 1 in the position as shown, this provides ample shielding against the upward movement of any projectile, because of the proportionally enlarged circular area of protection afforded by the shield, in the category of any chip or rock or concrete, in order to protect the head of the worker, while using such a potentially injury causing instrument. Most workers normally utilize safety features when working with an air hammer, such as safety goggles, a hard hat, or the like, but these type of safety means do not shield the surface of the face, from below, during usage of an air hammer of this type, and therefore, the application of this safety deflector to the hammer housing, in the position and manner as shown, provides that necessary shield to eliminate and prevent the incidence of damage to the worker, as explained.

As can be further seen, the shield flares outwardly, below the neck portion, in order to provide ample obstruction to the upward movement of rock, as explained, and to add further strength to the deflector, it extends downwardly, in the shape of a bell, as can be easily seen, to provide further reinforcement and a sustained useful life to this type of a safety device, even when utilized for a lengthy period of time, for this rugged type of application. Normally, it has been found that the lower end of the flaring section 4, if it has a dimension of approximately 6 to 9 inches in diameter, and preferably in the range of 7 inches in diameter, furnishes adequate shield against the upward movement of any projectile, such as a chip of concrete or rock, to add safety to the face of any worker, when arranged in the working position as previously explained.

Figure 4:
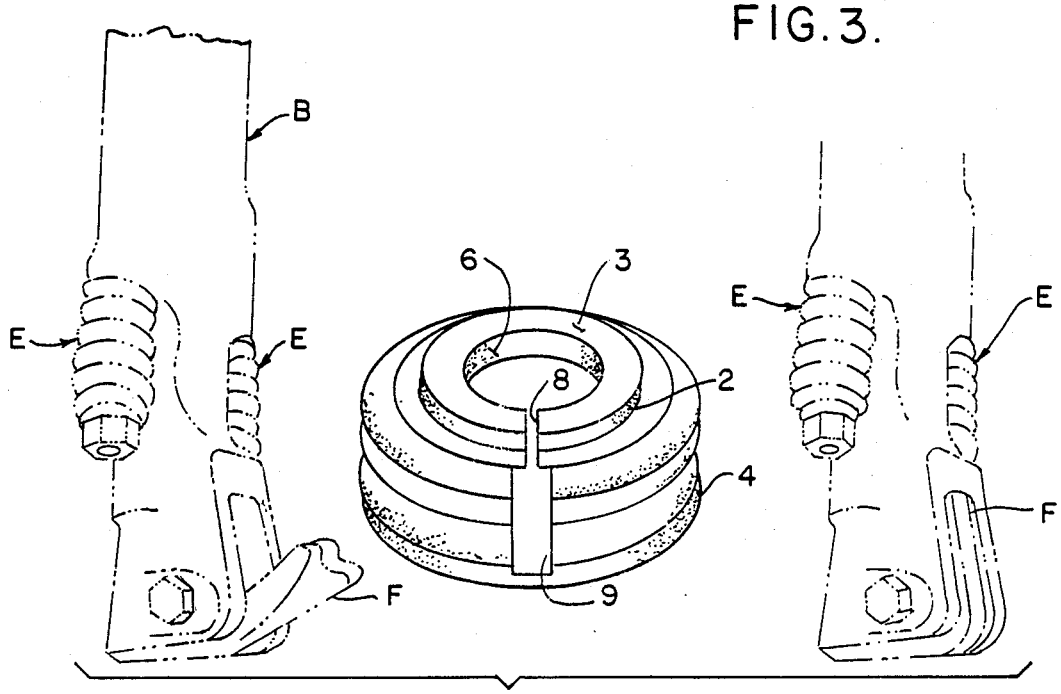
FIG. 4 is a oblique view of the safety deflector, showing its integral neck and flaring portions, with the clearance slot provided therein, to facilitate its installation onto the bottom of an air hammer, and to allow manipulation of its chisel lever, as shown in a chisel installation position, as in the left side of the figure, or pivoted into a chisel locking position, as shown at the right side of said figure.

As can be also seen in FIG. 4, the installation and application of this safety deflector to the air hammer, and its sustained usage by the worker once installed, has been taken into consideration. As can be noted, a slot, as at 8, extends upwardly through the neck portion 2, and through its flange 3, in order to provide for a widening of its opening 6 as when installing this deflector upon the lower housing of an air hammer. In addition, the slot 8 extends further downwardly, and opens into a more widened slot, as at 9, which provides clearance for the manipulation and pivoting of the locking lever F, as previously explained, which is useful for holding or releasing of the chisel or bit D, from the air hammer. The width of the slot 9 is slightly greater than the width of the lever F, and its length, and extends downwardly into the flaring portion or the side wall 4 of the shield, to that depth that allows the lever to be pivoted downwardly into its opened position, as shown at the left side of FIG. 4, as when removing or inserting a bit within the hammer, with the slot 9 extending upwardly within the deflector, in the manner as shown, so as to provide clearance for the pivot upwardly and closure of the lever F, as shown at the right side of FIG. 4.

As further previously explained, the durometer hardness of the shield is sufficient to provide rigidity to the safety deflector so that it can have a sustained useful life, and likewise, not flex too easily so that projected pieces of rock or concrete can fly upwardly and past the deflector, thereby minimizing its usefulness. At the same time, the deflector cannot be fabricated of so hard of a plastic that it makes it too difficult to expand its neck portion 2, as along its slot 8, when being installed onto the lower end of the air hammer, as can be seen. As noted, the lower end of the air hammer does have rather irregular features, as for example, at the location of its locking lever F, and which is held into position by means of its pivot pin, as noted, and therefore, sufficient flexibility within the structure of the safety deflector is necessary, in order to clear these structured features, when initially installing the shield into an operative position upon its housing.

Variations or modifications to the subject matter of this invention may occur to those skilled in the art upon reviewing the subject matter of this invention. Such variations or modifications, if within the spirit of this invention, are intended to be encompassed within the scope of any claims to patent protection issuing upon this development. The description of the preferred embodiment set forth herein is done so for illustrative purposes only.

Having thus described the invention, what is claimed and desired to be secured by letters Patent is:

1. A safety deflector for an apparatus in the category of an air hammer and concrete breaker, said apparatus being of the type having an elongated housing with an operating handle provided at its upper end, and a removable chisel provided at its lower end, the improvement comprising, a shield for mounting upon said housing, said shield having a neck portion disposed for securement upon said housing above its chisel, and a flaring portion integral with said neck portion and extending outwardly to function as a shield to prevent and intercept the upward movement of dirt, dust, broken chisel parts, and rock or concrete as the apparatus and chisel are in usage, said flaring portion of the shield being angled downwardly, and configured into a bell shape, said shield being formed of resilient material, there being a slot formed through the said shield and extending upwardly into its neck portion, for opening at the top of the shield, to provide clearance for application of said shield to the apparatus housing upon installation, and a clamp securing around said neck portion of said shield to fit it to the apparatus upon its installation.

2. The invention of claim 1 and wherein said slot providing further clearance to facilitate the application or removal of the chisel from the hammer.

3. The invention of claim 1 and wherein said resilient material being polymer.

4. The invention of claim 1 and wherein said resilient material being rubber.

* * * * *